Figure 3:
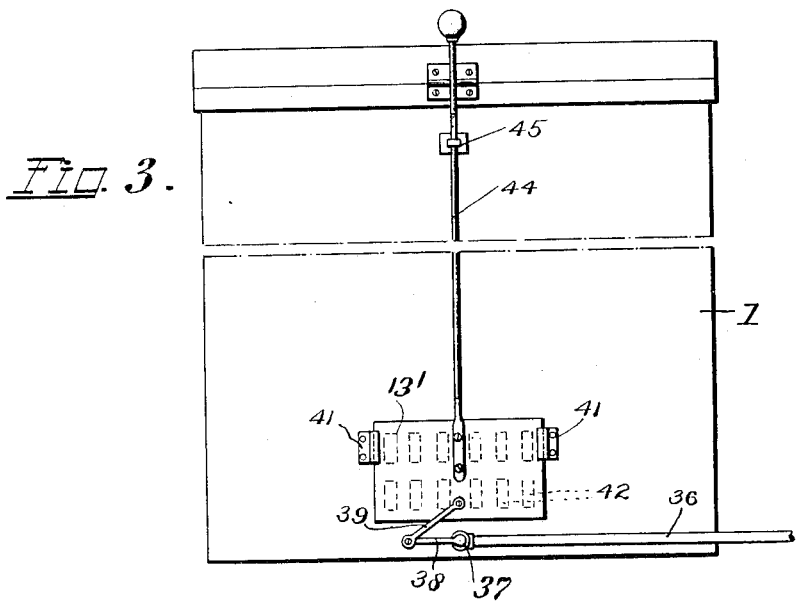

G. H. HEWITT.
HEATING APPARATUS FOR FIRELESS COOKERS.
APPLICATION FILED OCT. 1, 1912.
1,120,488.
Patented Dec. 8, 1914.
2 SHEETS—SHEET 1.
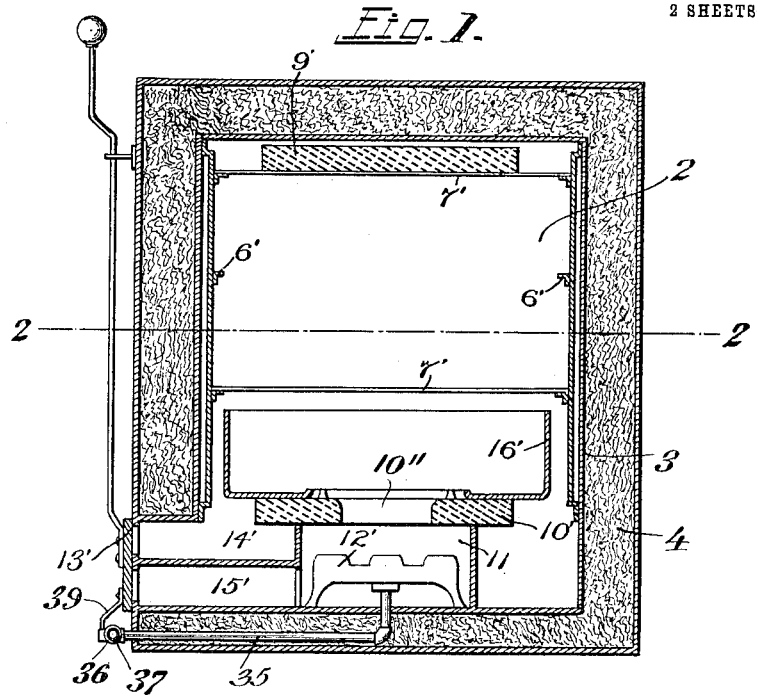
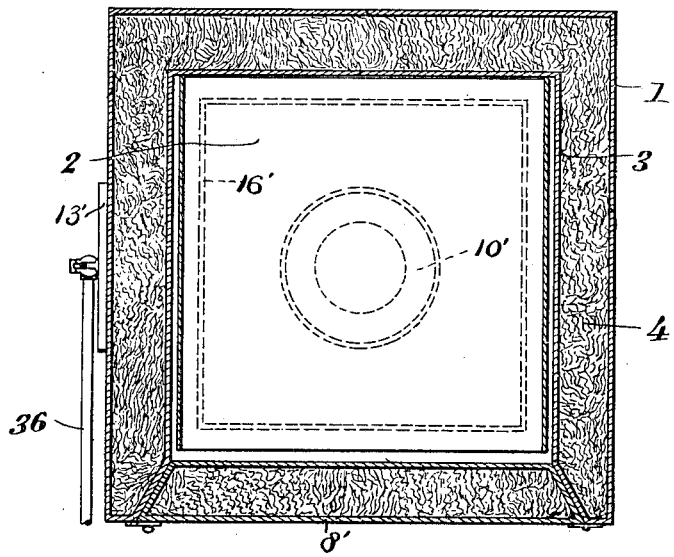
Witnesses:
James Cronin
S. C. Hurley
Inventor
Guy H. Hewitt
By Victor J. Evans
Attorney
THE NORRIS PETERS CO., WASHINGTON, D. C.

G. H. HEWITT.
HEATING APPARATUS FOR FIRELESS COOKERS.
APPLICATION FILED OCT. 1, 1912.

1,120,488.

Patented Dec. 8, 1914.
2 SHEETS—SHEET 2.

Witnesses

Inventor
Guy H. Hewitt
By Victor J. Evans
Attorney

UNITED STATES PATENT OFFICE.

GUY H. HEWITT, OF PLAINFIELD, NEW JERSEY.

HEATING APPARATUS FOR FIRELESS COOKERS.

1,120,488.  Specification of Letters Patent.  Patented Dec. 8, 1914.

Application filed October 1, 1912. Serial No. 723,365.

*To all whom it may concern:*

Be it known that I, GUY H. HEWITT, a citizen of the United States, residing at Plainfield, in the county of Union and State of New Jersey, have invented new and useful Improvements in Heating Apparatus for Fireless Cookers, of which the following is a specification.

The general object of the invention is to admit of storing the heat from a suitable generator for the purpose of utilizing this heat for various purposes, such as cooking. And to this end the invention consists in combining a heat generator with a heat insulated container and so arranging the parts as to admit of the introduction of the heat from the generator into the container.

Other objects will appear and be better understood from that embodiment of my invention of which the following is a specification, reference being had to the accompanying drawings forming part hereof, in which:—

Figure 1 is a vertical longitudinal section of one embodiment of my invention showing the positions occupied by the several parts when the device is in use. Fig. 2 is a horizontal sectional view of the same cut on the line 2—2 of Fig. 1. Fig. 3 is a side elevation of the same.

Referring to the drawings, 1 represents the stove casing, formed of any suitable material, preferably sheet iron. The cooking chamber 2 is provided with a metallic lining 3 which is spaced from the casing 1 and the intervening space is filled with any suitable non-conductor of heat as indicated at 4. The chamber 2 is provided at its opposite sides with brackets 6'—6' which are adapted to support racks or trays 7'—7'. Any convenient number of brackets and racks or trays may be provided. Access to the chamber 2 is had through a lateral opening in the casing and passage through this opening is controlled by a swinging door 8' constructed so as to tightly fit, when closed, within the opening. An imperforate slab 9' preferably of soapstone is supported by the uppermost rack 7' and a slab 10' of similar material is supported at the lower portion of the cooking chamber 2. As shown in Fig. 1 of the drawing the slab 10' is supported upon the upper edge of a flange 11' which in turn is mounted upon the bottom of the cooking chamber. The slabs 9' and 10' are supported approximately in parallel relation, and are spaced from each other, the slab 9' being located vertically above the slab 10'. The slab 10' is provided with a central opening indicated at 10" and the slab 9' extends across or bridges the opening 10" in the slab 10'. A heat generator 12' is located in the lower portion of the chamber 2 and within the flange 11'. Flues 14' and 15' lead into the lower portion of the chamber 2 and into the space within the flange 11' respectively and a slide 13' is arranged to move over the outer ends of the said flues. By reference to Fig. 3 of the drawing it will be seen that the slide 13' is mounted in guides 41 attached to the casing and a rod 44 is attached to the said slide and passes through a guide 45 also attached to the casing. A fuel pipe 36 is provided with a valve 37 having a handle 38 which is connected by means of a link 39 with the slides 13'. A pipe 35 connects the casing of the valve 37 with the heat generator 12'.

When the slide 13' is elevated by using the rod 44 the link 39 turns the handle 38 of the valve 37 so that communication is established between the pipes 36 and 35 and the fuel gas is permitted to flow through the generator 12' where it is ignited. When the slide 13' is lowered, which may be done by using the rod 44, the link 39 turns the handle 38 so that the valve 37 is closed and consequently the flow of fuel through the pipes 36 and 35 is interrupted. When the slide 13' is moved in a downward direction it closes the outer ends of the flues 14' and 15' and consequently all of the heat which is in the cooking chamber 2 is trapped. When the slide 13' is elevated it is moved above the outer end of the said flues 14' and 15' and consequently cold air may pass into the flue 15' to the heat generator 12' and the products of combustion may pass out of the chamber 2 through the flue 14'. The heat ascends from the generator 12' and passes through the opening in the lowermost slab 10' and ascends directly against the uppermost slab 9' which bridges the said opening 10" in the slab 10', consequently the slabs 9' and 10' are uniformly heated in view of the fact that they are spaced from each other and all of their surfaces are exposed to the heat. The slabs 9' and 10' being of soap stone or similar material are heat absorbing and these slabs are arranged one above the other and also above the heat generator 12'. Whatever the number of heat absorbing slabs used, all except the uppermost one are provided with intermediate openings so as to allow the heat from the heat generator to pass upward through the openings and heat the slabs uniformly.

What is claimed as new is:—

In a stove having a heat retaining chamber, a plurality of heat absorbing elements and a heat generator within said chamber, certain of the said heat absorbing elements being arranged contiguous to the top and bottom of the said chamber, the lowermost element being formed with an aperture through which heat from the generator passes onto the uppermost absorbing element.

In testimony whereof I affix my signature in presence of two witnesses.

GUY H. HEWITT.

Witnesses:
 LEMUEL SMITH, Jr.,
 THEODORE E. JOHNSTONE.

Copies of this patent may be obtained for five cents each, by addressing the "Commissioner of Patents. Washington, D. C."